Feb. 16, 1932.                A. NYMAN                1,845,173
                     POWER FACTOR CONTROLLING DEVICE
                          Filed Sept. 3, 1924
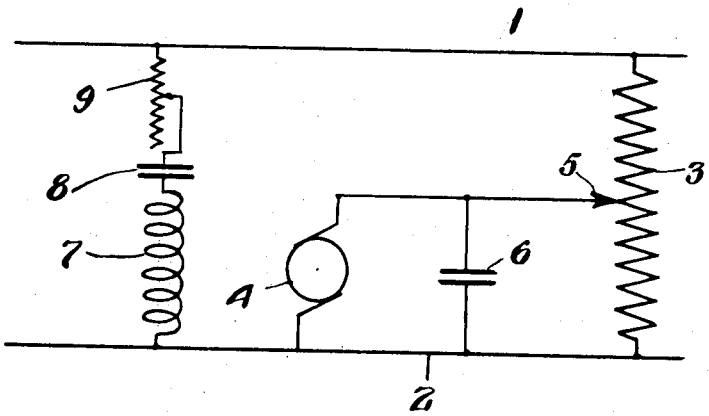
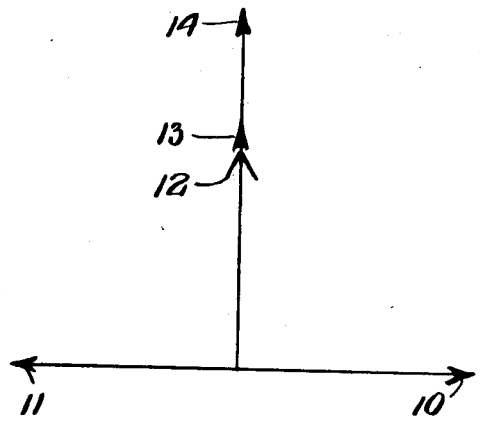 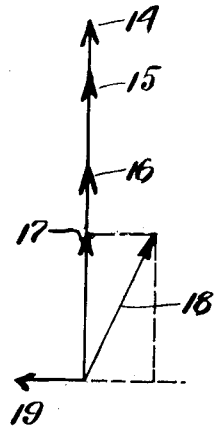
INVENTOR
ALEXANDER NYMAN
BY
ATTORNEY Patented Feb. 16, 1932

1,845,173

UNITED STATES PATENT OFFICE

ALEXANDER NYMAN, OF EAST ORANGE, NEW JERSEY, ASSIGNOR TO DUBILIER CONDENSER CORPORATION, OF NEW YORK, N. Y., A CORPORATION OF DELAWARE

POWER FACTOR CONTROLLING DEVICE

Application filed September 3, 1924. Serial No. 735,571.

This invention relates to auxiliary apparatus for alternating current motors; particularly apparatus for enabling the characteristics of the operating circuit of an alternating current motor to be more advantageously controlled.

An object of the invention is to provide apparatus comprising a simple and convenient arrangement of condensers for an alternating current motor, such as a shunt motor, for example, of such a nature that the power factor of the motor can be corrected and increased and thereby the efficiency of the motor made greater in practice. More in detail, the object includes the provision both in the field and in the armature circuits of a shunt motor of condensers arranged so that such a motor can operate satisfactorily on alternating current supply.

It is well known in the art that series motors can be compensated for power factor by means of condensers connected in parallel with the whole or with part of the circuit of the series motor; but in the prior art it is not shown that a successful shunt alternating current motor can be thus operated, as in a motor of such type, the phase relation between the magnetic field and the armature voltage is incorrect, and for that reason the operation is unstable and inefficient. The difference in phase relation is due to the smaller inductance of the armature circuit as compared with the inductance of an appropriate field circuit.

To overcome these difficulties a condenser is connected in series with the field circuit and adjusted to such a magnitude that the current through the field circuit is approximately in phase with the supply voltage. Since the magnetic field is always in phase with the current, this compels the magnetic field to be in phase with the line voltage and therefore the back electro-motive force in the armature is also in phase with the line voltage. A motor with only this addition would operate satisfactorily as far as speed and stability is concerned, but it would have the disadvantage that the armature would draw a current which is somewhat out of phase on account of high inductive effects in said armature. By connecting a condenser in parallel with the armature only, in addition to the field condenser mentioned above, the poor power factor can be corrected until the current drawn from the line by this armature circuit combination is also in phase with the line voltage.

The nature of the invention is set forth in the following description taken with the accompanying drawings, whereon, Figure 1 shows diagrammatically a shunt motor associated with apparatus according to my invention; and Figures 2 and 3 are explanatory vector diagrams.

On the drawings, the same numerals identify the same parts throughout.

I show at 1 and 2 a pair of main supply leads across which is bridged a potential divider or rheostat 3. At 4 is indicated armature of a motor, one brush of which is connected to one of the leads such as the lead 2, and the other brush of which is connected to a movable contact 5, which slides along the rheostat 3. Across the armature terminals is shunted a condenser 6.

The field winding of the motor 7 is connected to one of the leads such as the lead 2 and is in series with another condenser 8 and a rheostat 9 attached to the opposite lead 1, so that the field 7 and the condenser 8 and rheostat 9 in series, are bridged across the two leads, the same as the rheostat 3.

Figure 2 presents a vector diagram of the electrical conditions in the field circuit; the numeral 10 indicating the voltage at the terminals of the field condenser 8; while the numeral 11 indicates the voltage at the terminals of the field windings 7, these two factors being adjusted to balance each other; while the vertical distance of the arrowhead 12 above the line 10—11 represents the strength of the magnetic field, the distance of the arrowhead 13 above the same line represents the strength of the current through the field circuit; and the distance of the arrowhead 14 above the same line represents the full voltage of the line. With the condenser selected to balance the effect of the coils of the field windings 7, the current through the field of the motor and the voltage of the line can be brought into phase with each other as shown.

In Figure 3, the distance of the arrowpoint 14 above the horizontal line through the foot of the vertical line bearing this arrowpoint represents, as before, the full line voltage; while the distance of the arrowpoint 15 above the same horizontal line represents the total current through the rheostat 3. Similarly, the distance of the arrowpoint 16 above the same horizontal line represents the voltage on the armature 4; while the distance of the arrow-point 17 above the horizontal line mentioned, represents the amount of current which flows through the armature 4, and the armature condenser 6. This current is made up of two components, the current through the armature 4 indicated by the vector line 18, and the current through the condenser 6, represented by the vector line 19. The condenser is so selected as to capacity that the resultant vector 17 representing the current through the armature and the condenser together, is in phase with the voltage through the armature, with the total current through the rheostat 3 and with the line voltage. The conditions in the working circuit of the motor including both the field and the armature can thus be made equivalent to the conditions that would obtain if direct current were used, and the power factor can, therefore, practically be taken as unity and the efficiency of the motor increased to its maximum.

The primary purpose of the armature condenser 6 and the field condenser 8 is, of course, to supply capacity for the field circuits and armature circuits of the motor, in the measure required to balance the effect of the coils of the armature and field windings; while the two rheostats 3 and 9 enable the resistances of the two circuits to be controlled at will. Of course, the condensers 6 and 8 can be adjustable if desired.

The operation of a shunt motor provided with the above improvements is exactly like that of a direct current shunt motor, both as regards speed relation, stability, efficiency, and regulation. For the purpose of regulation I have therefore shown resistances both in the field circuit and in the armature circuit. The resistance 9 in the field circuit has exactly the same effect as resistance in the field circuit of a direct current shunt motor; that is, the more resistance is inserted in the circuit the higher will be the speed.

I have also shown a resistance 3 in the armature circuit, and for the purpose of illustration this resistance is connected as a potential divider from which any voltage can be secured to operate the armature at successively lower speeds. The effect is again exactly similar to that of a similar potential divider control on a direct current motor. By disconnecting one end (lower) of the resistance 3 from the line, this resistance becomes a series resistance in the armature circuit and will then act as a regulator for speed exactly as a similar series resistance would in the armature of a direct current motor.

It is to be observed that unless both field current and armature current are individually in phase with the supply voltage, such regulation will become rather difficult, while the operation of the motor will not be satisfactory. It is also evident that a condenser in series with the armature will not be as effective as a condenser in parallel with the armature as shown at 6, because such a series condenser, if it is chosen of such a magnitude as to bring the current in phase with the line voltage would immediately throw the voltage on the armature 4 out of phase with the line voltage and therefore out of phase with the magnetic field. To bring it back into phase with the magnetic field it would therefore be necessary either to change the capacity values in the field circuit and make the current in the field out of phase with the voltage, or else change the mechanical relation of brushes and field poles so that the above in-phase relation between the magnetic field and the voltage is secured. Both of these expedients would result in a motor which is not as stable in its operating characteristics and not as well adapted to a satisfactory speed regulation as a motor provided with all the features of the present disclosure.

This disclosure is illustrative only however, and I may vary the details of arrangement of parts to the full extent permitted by the scope and meaning of the appended claim, in which the novelty of the invention is expressed.

Having described my invention, what I believe to be new and desire to secure and protect by Letters Patent of the United States is:—

A shunt alternating current motor having a condenser in series with the field winding to put its current and the resulting electromagnetic field substantially in phase with the line voltage, a second condenser in shunt with the armature of said motor to put the resulting current flowing through said armature and second condenser substantially in phase with the line voltage, a resistor connected across the terminals of the motor, a portion of said resistance being in parallel with said armature circuit and another portion of said resistance being in series with the armature circuit to control the speed of the motor without changing the power factor of the armature circuit.

Signed at New York in the county of New York and State of New York this 27th day of August, A. D. 1924.

ALEXANDER NYMAN.